US012794810B2

(12) United States Patent
Lin

(10) Patent No.: US 12,794,810 B2
(45) Date of Patent: Nov. 10, 2026

(54) DUAL-STACK LOAD BALANCING METHOD, SERVICE CLUSTER HOST, AND VOICE OVER INTERNET PROTOCOL (VOIP) SYSTEM

(71) Applicant: YEALINK (XIAMEN) NETWORK TECHNOLOGY CO., LTD., Xiamen (CN)

(72) Inventor: Yanzhang Lin, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 60 days.

(21) Appl. No.: 18/820,384

(22) Filed: Aug. 30, 2024

(65) Prior Publication Data

US 2025/0080462 A1 Mar. 6, 2025

(30) Foreign Application Priority Data

Aug. 31, 2023 (CN) .......................... 202311111532.8

(51) Int. Cl.
*H04L 47/125* (2022.01)
*H04L 43/0852* (2022.01)

(52) U.S. Cl.
CPC ........ *H04L 47/125* (2013.01); *H04L 43/0852* (2013.01)

(58) Field of Classification Search
CPC .......................... H04L 47/125; H04L 43/0852
USPC ......................................................... 709/238
See application file for complete search history.

(56) References Cited

U.S. PATENT DOCUMENTS

| | | | | |
|---|---|---|---|---|
| 9,654,540 | B2 * | 5/2017 | Thyni | H04L 67/00 |
| 2003/0179742 | A1 * | 9/2003 | Ogier | H04L 45/26<br>370/389 |
| 2013/0070639 | A1 * | 3/2013 | Demura | H04L 61/103<br>370/254 |
| 2014/0258496 | A1 * | 9/2014 | Wu | H04L 47/125<br>709/223 |
| 2014/0368874 | A1 * | 12/2014 | Suzuki | H04N 1/33346<br>358/1.15 |
| 2023/0055046 | A1 * | 2/2023 | Whited | H04J 3/0644 |

* cited by examiner

*Primary Examiner* — Suraj M Joshi
*Assistant Examiner* — Ayele F Woldemariam

(57) ABSTRACT

Provided are a dual-stack load balancing method, a service cluster host, and a VoIP system. The method includes: detecting a survival status of a link of a selected communication device, and quantities of communication devices and transmission delays under an IPv4 link and an IPv6 link in a current detection cycle; calculating data weights of first and second data fields based on identification information indicating a survival status of a current link, the quantities of communication devices, and the transmission delays; comparing the data weights of the first and second data fields, and selecting a link corresponding to a data field with a smaller data weight as a target link; and if a target link corresponding to the selected communication device is not the current link of the selected communication device in the detection cycle, switching a link connection of the selected communication device to another link.

9 Claims, 3 Drawing Sheets

DUAL-STACK LOAD BALANCING METHOD, SERVICE CLUSTER HOST, AND VOICE OVER INTERNET PROTOCOL (VOIP) SYSTEM

CROSS REFERENCE TO RELATED APPLICATIONS

The present application claims the benefit of Chinese Patent Application No. 202311111532.8 filed on Aug. 31, 2023, the contents of which are incorporated herein by reference in their entirety.

TECHNICAL FIELD

The present disclosure relates to the field of the dual-stack technology in a voice over Internet protocol (VoIP) system, and in particular, to a dual-stack load balancing method, a service cluster host, and a VoIP system.

BACKGROUND

With the development of the dual-stack technology, more voice over Internet protocol (VoIP) devices support dual network cards or dual stacks. For problems of a high network load on a network with a single protocol stack and sudden severe link blocking or link failure when an Internet Protocol version 4 (IPv4) link is connected, how to achieve load balancing between the IPv4 link and an Internet Protocol version 6 (IPv6) based on a corresponding scenario is an urgent problem to be solved.

SUMMARY

The present disclosure provides a dual-stack load balancing method, a service cluster host, and a VoIP system. The dual-stack load balancing method can achieve load balancing between an IPv4 link and an IPv6 link to achieve a better VoIP experience.

An embodiment of the present disclosure provides a dual-stack load balancing method, including:

- detecting a quantity of communication devices connected through an IPv4 link to obtain a first quantity, and detecting a quantity of communication devices connected through an IPv6 link to obtain a second quantity in a current detection cycle;
- detecting a first transmission delay in data transmission with a selected communication device over the IPv4 link, and detecting a second transmission delay in data transmission with the selected communication device over the IPv6 link;
- generating a first data field based on identification information indicating a survival status of a current link of the selected communication device, the first quantity, and the first transmission delay, and calculating a data weight of the first data field;
- generating a second data field based on the identification information, the second quantity, and the second transmission delay, and calculating a data weight of the second data field;
- comparing the data weight of the first data field with the data weight of the second data field, and selecting a link corresponding to a data field with a smaller data weight as a target link corresponding to the current detection cycle; and
- when target links corresponding to the selected communication device are not the current link of the selected communication device in N consecutive detection cycles, switching a link connection of the selected communication device to another link; otherwise, performing no link switching.

Further, before the detecting a quantity of communication devices connected through an IPv4 link to obtain a first quantity, and detecting a quantity of communication devices connected through an IPv6 link to obtain a second quantity in a current detection cycle, the dual-stack load balancing method further includes:

- sending a heartbeat signal to the selected communication device to detect whether the current link of the selected communication device is alive; and
- if the current link of the selected communication device is not alive, switching the link connection of the selected communication device to the another link; or
- if the current link of the selected communication device is alive, continuing to detect the first quantity and the second quantity.

Further, the dual-stack load balancing method further includes: when switching the link connection of the selected communication device to the another link, performing seamless reconnection on a corresponding service of the selected communication device.

Further, transmission delays of the IPv4 link and the IPv6 link are detected through a ping technology.

Further, the generating a first data field based on identification information indicating a survival status of a current link of the selected communication device, the first quantity, and the first transmission delay includes:

storing the identification information, the first quantity, and the first transmission delay in a 16-bit first blank field in a binary form to generate the first data field, where during the storage, the first quantity is stored in $0^{th}$ to $7^{th}$ bits of the first blank field, the first transmission delay is stored in $8^{th}$ to $10^{th}$ bits of the first blank field, a preset reserved field is stored in $11^{th}$ to $14^{th}$ bits of the first blank field, and the identification information is stored in a $15^{th}$ bit of the first blank field.

Further the generating a second data field based on the identification information indicating the survival status of the current link of the selected communication device, the second quantity, and the second transmission delay includes:

storing the identification information, the second quantity, and the second transmission delay in a 16-bit second blank field in a binary form to generate the second data field, where during the storage, the second quantity is stored in $0^{th}$ to $7^{th}$ bits of the second blank field, the second transmission delay is stored in $8^{th}$ to $10^{th}$ bits of the second blank field, a preset reserved field is stored in $11^{th}$ to $14^{th}$ bits of the second blank field, and the identification information is stored in a $15^{th}$ bit of the second blank field.

Based on the above method embodiment, the present disclosure correspondingly provides a service cluster host, including a processor, a memory, and a computer program that is stored in the memory and configured to be executed by the processor, where when executing the computer program, the processor implements the dual-stack load balancing method described in the above embodiment of the present disclosure.

Based on the above service cluster host, the present disclosure correspondingly provides a VoIP system containing a service cluster host, including a service cluster host, an IPv4 router, an IPv6 router, and a plurality of communication devices, where

- the service cluster host is separately connected to the IPv4 router and the IPv6 router;

the communication device is connected to the service cluster host through an IPv4 link corresponding to the IPv4 router, or connected to the service cluster host through an IPv6 link corresponding to the IPv6 router; and the service cluster host is configured to execute the dual-stack load balancing method described in the above embodiment of the present disclosure.

The present disclosure has following beneficial effects:

The embodiments of the present disclosure provide a dual-stack load balancing method, a service cluster host, and a VoIP system. The dual-stack load balancing method includes: detecting a survival status of a link of a selected device, and quantities of communication devices and transmission delays under an IPv4 link and an IPv6 link in a current cycle; calculating data weights of a first data field and a second data field based on identification information indicating a survival status of a current link, the quantities of communication devices, and the transmission delays; comparing the data weight of the first data field and the data weight of the second data field, and selecting a link corresponding to a data field with a smaller data weight as a target link; and if a target link corresponding to the selected communication device is not the current link of the selected communication device in the detection cycle, switching the selected communication device to another link; otherwise, performing no link switching. In the present disclosure, the data weights of the first data field and the second data field are respectively used to represent network load statuses of the IPv4 link and the IPv6 link. The data weights of the first data field and the second data field are calculated and compared, the link corresponding to the data field with the smaller data weight is selected as the target link, and the current link is switched to the target link. Therefore, the communication device can connect to a link with a lower load and a better network to obtain a better VoIP experience.

BRIEF DESCRIPTION OF THE DRAWINGS

To describe the technical solutions in the implementations of the present application more clearly, the drawings required to describe the implementations of the present application are briefly described below. Apparently, the drawings described below are only some implementations of the present application. Those of ordinary skill in the art may further obtain other drawings based on these drawings without creative efforts.

DETAILED DESCRIPTION

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
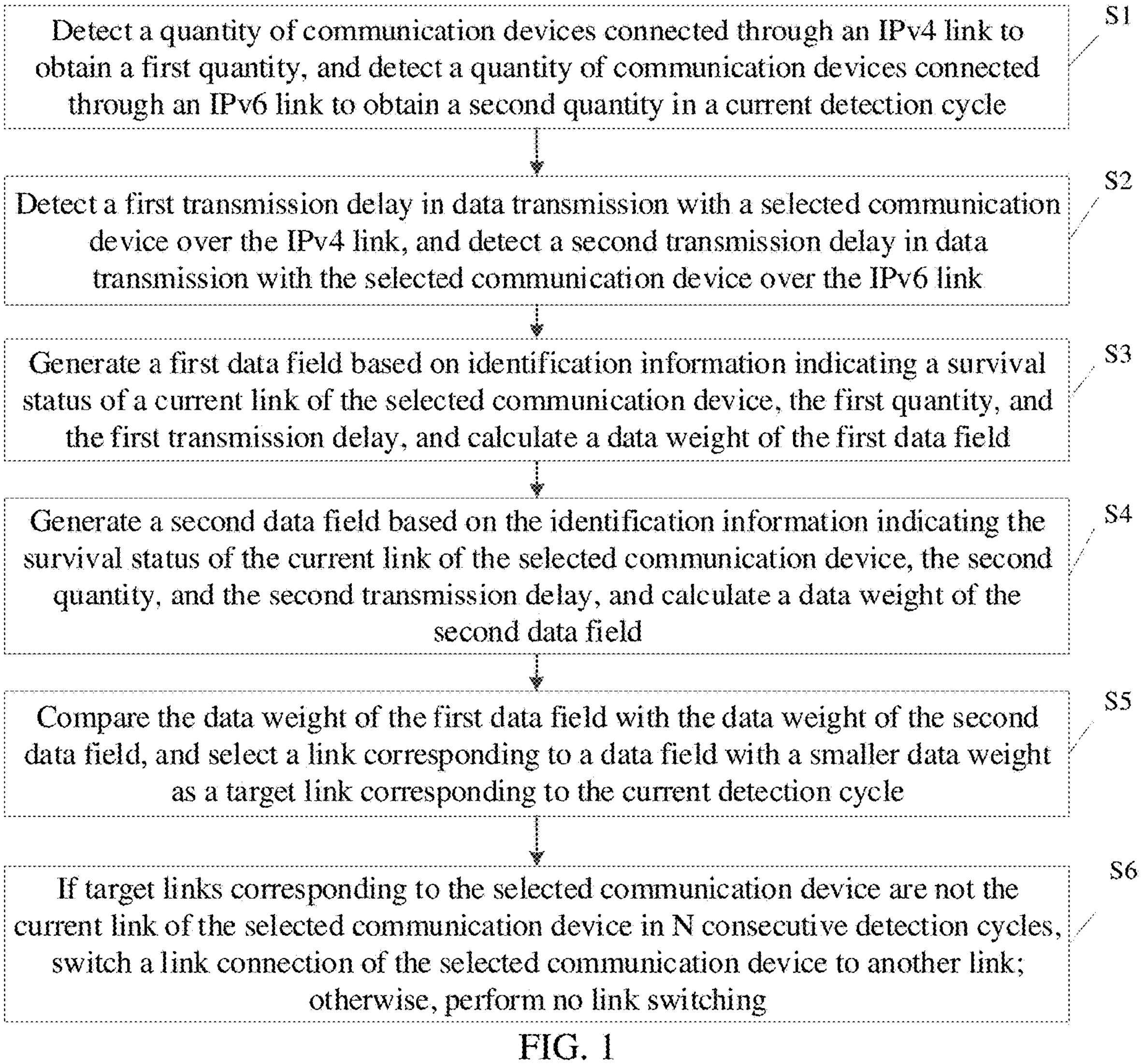
FIG. 1 is a schematic flowchart of a dual-stack load balancing method according to an embodiment of the present disclosure.

FIG. 1 is a schematic flowchart of a dual-stack load balancing method according to an embodiment of the present disclosure. The dual-stack load balancing method includes following steps:

S1: Detect a quantity of communication devices connected through an IPv4 link to obtain a first quantity, and detect a quantity of communication devices connected through an IPv6 link to obtain a second quantity in a current detection cycle.

In a preferred embodiment, when there is a new link, a service cluster host obtains a current quantity of IPv4 links. That is, when a communication tool initiates a link using IPv4, a recorded quantity of IPv4 links increases by 1. Similarly, when the communication tool initiates a link using IPv6, a recorded quantity of IPv6 links increases by 1.

In addition, before the first quantity and the second quantity are obtained, a heartbeat signal is sent to a selected communication device to detect whether a current link of the selected communication device is alive, so as to obtain identification information indicating a survival status of the current link.

If the current link of the selected communication device is alive, a $15^{th}$ bit of a data field of the current link is identified as 0.

If the current link of the selected communication device is not alive, the $15^{th}$ bit of the data field of the current link is identified as 1.

S2: Detect a first transmission delay in data transmission with the selected communication device over the IPv4 link, and detect a second transmission delay in data transmission with the selected communication device over the IPv6 link.

In a preferred embodiment, the first transmission delay in the data transmission with the selected communication device over the IPv4 link, and the second transmission delay in the data transmission with the selected communication device over the IPv6 link are detected.

Specifically, the above transmission delay detection may be as follows: The communication device transmits an ICMP data packet to the service cluster host, and then waits to receive a response data packet. Based on this, an initial node device estimates round-trip time of the data packet based on time and a quantity of successful responses. The round-trip time is denoted as time. The time is determined according to a transmission delay determining rule, and a resulting transmission delay is denoted as timeDelay.

The transmission delay determining rule is as follows:

$$1\text{ ms} >= \text{time}: timeDelay = 1$$

$$1\text{ ms} < \text{time} <= 10\text{ ms}: timeDelay = 2$$

$$10\text{ ms} < \text{time} <= 50\text{ ms}: timeDelay = 3$$

$$50\text{ ms} < \text{time} <= 100\text{ ms}: timeDelay = 4$$

$$100\text{ ms} < \text{time} <= 500\text{ ms}: timeDelay = 5$$

$$500\text{ ms} < \text{time} <= 1000\text{ ms}: timeDelay = 6$$

$$1000\text{ ms} < \text{time} <= 2000\text{ ms}: timeDelay = 7$$

$$2000\text{ ms} < \text{time}: timeDelay = 8.$$

For an illustrative purpose, the selected communication device sends an ICMP data packet to the IPv4 link of the service cluster host. Assuming that time at this moment is 0.5 ms, the obtained time is determined according to the transmission delay determining rule, and it can be obtained that the first transmission delay is 1.

Similarly, the selected communication device sends an ICMP data packet to the IPv6 link of the service cluster host. Assuming that time at this moment is 5 ms, the obtained time is determined according to the transmission delay determining rule, and it can be obtained that the second transmission delay is 2.

S3: Generate a first data field based on the identification information indicating the survival status of the current link of the selected communication device, the first quantity, and the first transmission delay, and calculate a data weight of the first data field.

In a preferred embodiment, the generating a first data field based on the identification information indicating the survival status of the current link of the selected communication device, the first quantity, and the first transmission delay includes:

storing the identification information, the first quantity, and the first transmission delay in a 16-bit first blank field in a binary form to generate the first data field, where during the storage, the first quantity is stored in $0^{th}$ to $7^{th}$ bits of the first blank field, the first transmission delay is stored in $8^{th}$ to $10^{th}$ bits of the first blank field, a preset reserved field is stored in $11^{th}$ to $14^{th}$ bits of the first blank field, and the identification information is stored in a $15^{th}$ bit of the first blank field.

Figure 2:
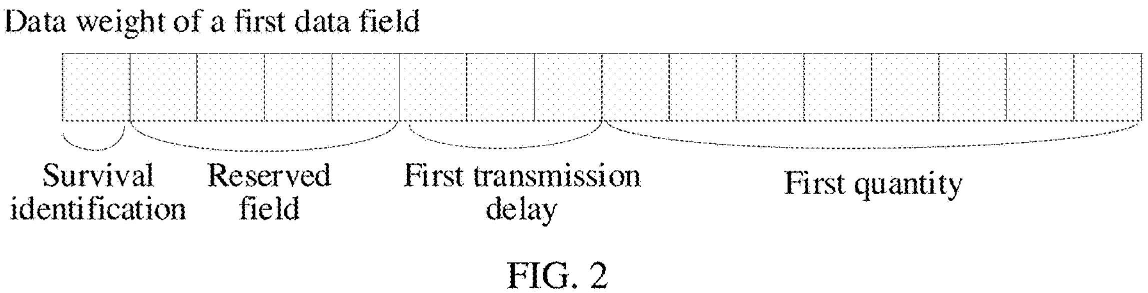
FIG. 2 is a schematic structural diagram of a first data field according to an embodiment of the present disclosure.

Specifically, the selected communication device stores the first quantity obtained in the S1, the identification information indicating the survival status of the current link, and the first transmission delay obtained in the S2 in corresponding locations as shown in FIG. 2. After the storage is completed, the first data field is obtained, and the data weight of the first data field is calculated.

For an illustrative purpose, assuming that the selected communication device obtains through calculation on the IPv4 link that the survival status identification information is 0, the first quantity is 18, and the first transmission delay is 1, the above information is stored in the first data field in the binary form, and it is calculated in a decimal form based on the first data field that the data weight of the first data field is 274.

S4: Generate a second data field based on the identification information indicating the survival status of the current link of the selected communication device, the second quantity, and the second transmission delay, which includes:

storing the identification information, the second quantity, and the second transmission delay in a 16-bit second blank field in the binary form to generate the second data field, where during the storage, the second quantity is stored in $0^{th}$ to $7^{th}$ bits of the second blank field, the second transmission delay is stored in $8^{th}$ to $10^{th}$ bits of the second blank field, a preset reserved field is stored in $11^{th}$ to $14^{th}$ bits of the second blank field, and the identification information is stored in a $15^{th}$ bit of the second blank field.

Figure 3:
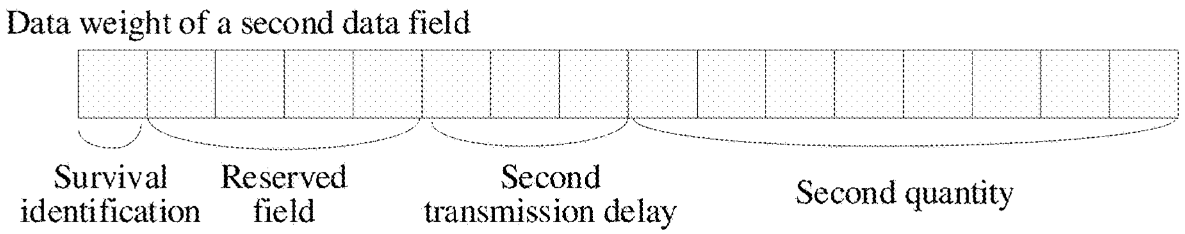
FIG. 3 is a schematic structural diagram of a second data field according to an embodiment of the present disclosure.

Specifically, the selected communication device stores the second quantity obtained in the S1, the identification information indicating the survival status of the current link, and the second transmission delay obtained in the S2 in corresponding locations as shown in FIG. 3. After the storage is completed, the second data field is obtained, and a data weight of the first data field is calculated.

For an illustrative purpose, assuming that the selected communication device obtains through the calculation on the IPv4 link that the survival status identification information is 0, the second quantity is 18, and the second transmission delay is 2, the above information is stored in the second data field in the binary form, and it is calculated in the decimal form based on the second data field that the data weight of the second data field is 530.

S5: Compare the data weight of the first data field with the data weight of the second data field, and select a link corresponding to a data field with a smaller data weight as a target link corresponding to the current detection cycle.

In a preferred embodiment, the data weight of the first data field is compared with the data weight of the second data field, and the link corresponding to the data field with the smaller data weight is selected as the target link corresponding to the current detection cycle.

For an illustrative purpose, according to the step S3, it can be obtained that the data weight of the first data field is 274, and according to the step S4, it can be obtained that the data weight of the second data field is 530. The data weight of the first data field is compared with the data weight of the second data field, and it is obtained that the data weight of the second data field is greater than the data weight of the first data field. In this case, the IPv4 link corresponding to the data weight of the first data field is used as the target link.

S6: If target links corresponding to the selected communication device are not the current link of the selected communication device in N consecutive detection cycles, switch a link connection of the selected communication device to another link; otherwise, perform no link switching.

In a preferred embodiment of the present disclosure, the steps S1 to S4 are repeatedly performed in three consecutive detection cycles. Whether none of target links obtained in the three consecutive detection cycles are the current link of the selected communication device is determined.

If none of the target links obtained in the three consecutive detection cycles are the current link of the selected communication device, the link connection of the selected communication device is switched to the another link.

Otherwise, no link switching is performed.

Further, when the link connection of the selected communication device is switched to the another link, seamless reconnection is performed on a corresponding service of the selected communication device.

For an illustrative purpose, assuming that the obtained three target links of the selected communication device on the IPv4 link in the three consecutive detection cycles meet following conditions, no link switching is performed:

(1) The three target links are all IPv4 links.

(2) Two of the three target links are IPv4 links, and the other one target link is the IPv6 link.

(3) One of the three target links is the IPv4 link, and the other two target links are IPv6 links.

Otherwise, the communication device is switched to the IPv6 link. In this case, the seamless reconnection is performed on the corresponding service of the selected communication device.

Based on the above method embodiment, another embodiment of the present disclosure further provides a service cluster host.

The service cluster host includes a processor, a memory, and a computer program that is stored in the memory and configured to be executed by the processor. When executing the computer program, the processor implements the dual-stack load balancing method in the above embodiment.

The processor may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or any conventional processor. The processor is a control center of the service cluster host, and various parts of the whole service cluster host are connected by various interfaces and lines.

The memory may be configured to store the computer program. The processor implements various functions of the service cluster host by running or executing the computer program stored in the memory and invoking data stored in the memory. The memory may mainly include a program storage area and a data storage area. The program storage area may store an operating system, an application program required by at least one function, and the like. The data storage area may store data created by a mobile phone, and the like. In addition, the memory may include a high-speed random access memory, and may further include a non-volatile memory, such as a hard disk, an internal storage, a plug-in hard disk, a smart media card (SMC), a secure digital (SD) card, a flash card, at least one magnetic disk storage device, a flash memory device, or another volatile solid-state storage device.

A dual-stack load balancing method provided in the embodiments of the present disclosure has following beneficial effects:

The data weight of the first data field and the second data field are respectively used to represent network load statuses of the IPv4 link and the IPv6 link. The data weights of the first data field and the second data field are calculated and compared, the link corresponding to the data field with the smaller data weight is selected as the target link, and the current link is switched to the target link. Therefore, the communication device can connect to a link with a lower load and a better network to obtain a better VoIP experience.

Figure 4:
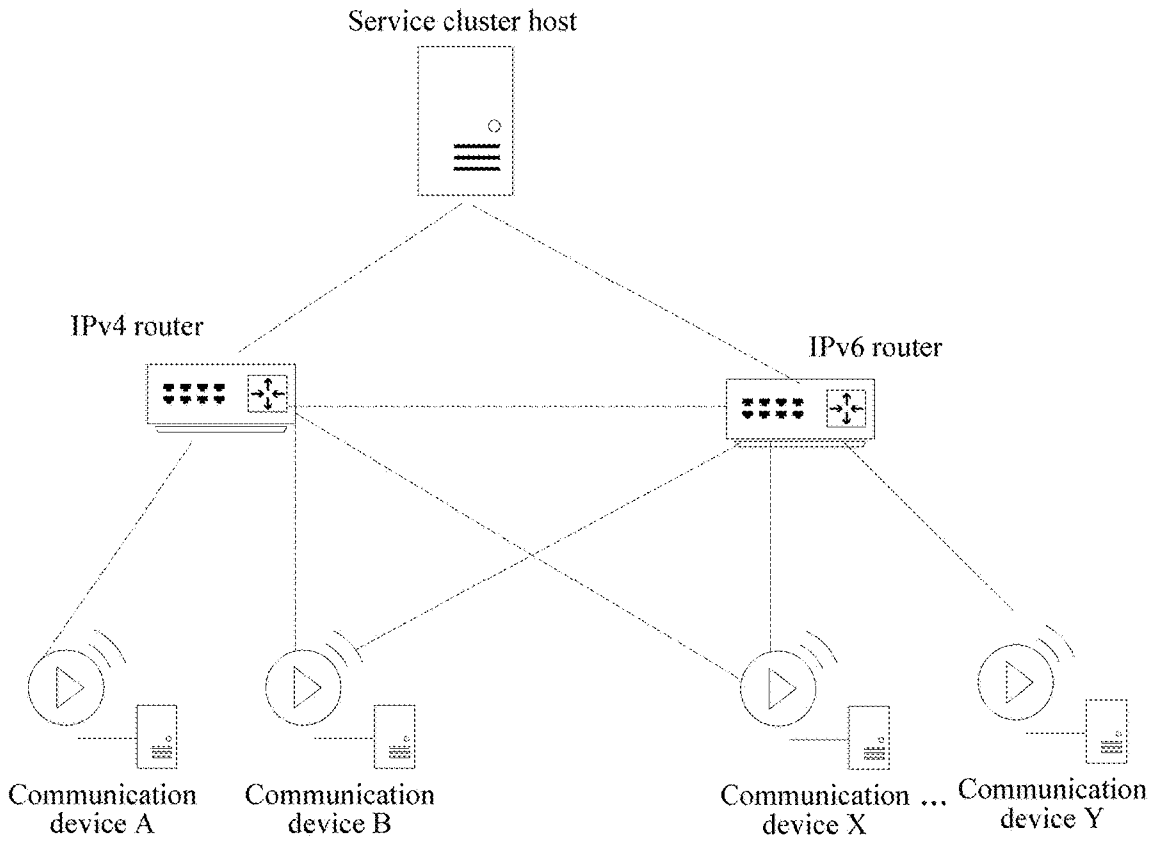
FIG. 4 is a schematic structural diagram of a VoIP system according to an embodiment of the present disclosure.

Further, FIG. 4 is a schematic structural diagram of a VoIP system according to an embodiment of the present disclosure.

The VoIP system includes a service cluster host, an IPv4 router, an IPv6 router, and a plurality of communication devices.

The service cluster host is separately connected to the IPv4 router and the IPv6 router.

The communication device is connected to the service cluster host through an IPv4 link corresponding to the IPv4 router, or connected to the service cluster host through an IPv6 link corresponding to the IPv6 router.

The service cluster host is configured to execute the dual-stack load balancing method described in the above embodiment of the present disclosure.

Figure 5:
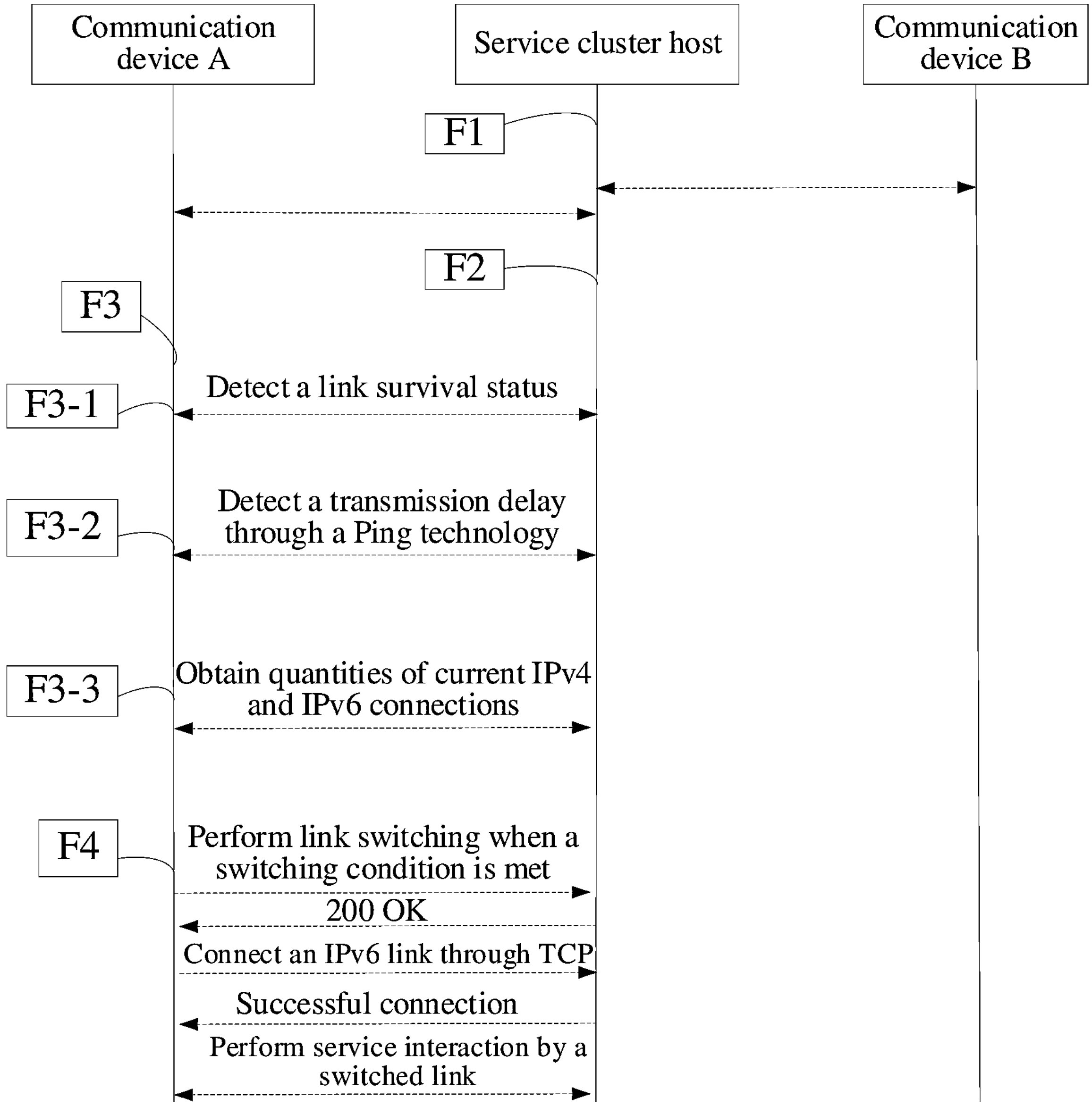
FIG. 5 is a schematic diagram of an internal process of a VoIP system according to an embodiment of the present disclosure.

In order to better illustrate the VoIP system provided in the present disclosure, the following describes in detail an internal process of the VoIP system in a preferred embodiment:

FIG. 5 is a schematic diagram of an internal process of a VoIP system according to an embodiment of the present disclosure. Steps in the flowchart are as follows:

F1: The service cluster host establishes connection to the communication device.

F2: The service cluster host records quantities of IPv4 and IPv6 connections.

F3: Take every 30 seconds as a detection cycle to detect statuses of IPv4 and IPv6 links.

F3-1: Send a heartbeat signal to a selected communication device to detect whether a corresponding link is alive.

F3-2: Detect respective time delays of the IPv4 and IPv6 links.

F3-3: Obtain quantities of current IPv4 and IPv6 connections of the service cluster host.

F4: Take every three detection cycles as a group, and perform link switching and smart service reconnection if none of target links in the three consecutive cycles are a current link of the communication device.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A dual-stack load balancing method, comprising:

detecting a quantity of communication devices connected through an Internet Protocol version 4 (IPv4) link to obtain a first quantity, and detecting a quantity of communication devices connected through an Internet Protocol version 6 (IPv6) link to obtain a second quantity in a current detection cycle;

detecting a first transmission delay in data transmission with a selected communication device over the IPv4 link, and detecting a second transmission delay in data transmission with the selected communication device over the IPv6 link;

generating a first data field based on identification information indicating a survival status of a current link of the selected communication device, the first quantity, and the first transmission delay, and calculating a data weight of the first data field;

generating a second data field based on the identification information, the second quantity, and the second transmission delay, and calculating a data weight of the second data field;

comparing the data weight of the first data field with the data weight of the second data field, and selecting a link corresponding to a data field with a smaller data weight as a target link corresponding to the current detection cycle; and when target links corresponding to the selected communication device are not the current link of the selected communication device in N consecutive detection cycles, switching a link connection of the selected communication device to another link; otherwise, performing no link switching;

wherein before the detecting a quantity of communication devices connected through an IPv4 link to obtain a first quantity, and detecting a quantity of communication devices connected through an IPv6 link to obtain a second quantity in a current detection cycle, the dual-stack load balancing method further comprises:

sending a heartbeat signal to the selected communication device to detect whether the current link of the selected communication device is alive; and if the current link of the selected communication device is not alive, switching the link connection of the selected communication device to the another link; or if the current link of the selected communication device is alive, continuing to detect the first quantity and the second quantity;

wherein the dual-stack load balancing method further comprises:

when switching the link connection of the selected communication device to the another link, performing seamless reconnection on a corresponding service of the selected communication device;

wherein the generating a first data field based on identification information indicating a survival status of a current link of the selected communication device, the first quantity, and the first transmission delay comprises:

storing the identification information, the first quantity, and the first transmission delay in a 16-bit first blank field in a binary form to generate the first data field, wherein during the storage, the first quantity is stored in 0th to 7th bits of the first blank field, the first transmission delay is stored in 8th to 10th bits of the first blank field, a preset reserved field is stored in 11th to 14th bits of the first blank field, and the identification information is stored in a 15th bit of the first blank field.

2. The dual-stack load balancing method according to claim 1, wherein transmission delays of the IPv4 link and the IPv6 link are detected through a ping technology.

3. The dual-stack load balancing method according to claim 1, wherein the generating a second data field based on the identification information indicating the survival status of the current link of the selected communication device, the second quantity, and the second transmission delay comprises:

storing the identification information, the second quantity, and the second transmission delay in a 16-bit second blank field in a binary form to generate the second data field, wherein during the storage, the second quantity is stored in 0th to 7th bits of the second blank field, the second transmission delay is stored in 8th to 10th bits of the second blank field, a preset reserved field is stored in 11th to 14th bits of the second blank field, and the identification information is stored in a 15th bit of the second blank field.

4. A service cluster host, comprising a processor, a memory, and a computer program that is stored in the memory and configured to be executed by the processor, wherein when executing the computer program, the processor implements the dual-stack load balancing method according to claim 1.

5. A voice over Internet protocol (VoIP) system, comprising a service cluster host, an IPv4 router, an IPv6 router, and a plurality of communication devices, wherein the service cluster host is separately connected to the IPv4 router and the IPv6 router;

the communication device is connected to the service cluster host through an IPv4 link corresponding to the IPv4 router, or connected to the service cluster host through an IPv6 link corresponding to the IPv6 router; and the service cluster host is configured to execute the dual-stack load balancing method according to claim 1.

6. The service cluster host according to claim 4, wherein transmission delays of the IPv4 link and the IPv6 link are detected through a ping technology.

7. The service cluster host according to claim 4, wherein when executing the computer program, the processor is configured to implement the dual-stack load balancing method comprising:

storing the identification information, the second quantity, and the second transmission delay in a 16-bit second blank field in a binary form to generate the second data field, wherein during the storage, the second quantity is stored in 0th to 7th bits of the second blank field, the second transmission delay is stored in 8th to 10th bits of the second blank field, a preset reserved field is stored in 11th to 14th bits of the second blank field, and the identification information is stored in a 15th bit of the second blank field.

8. The VoIP system according to claim 5, wherein transmission delays of the IPv4 link and the IPv6 link are detected through a ping technology.

9. The VoIP system according to claim 5, wherein the service cluster host is configured to execute the dual-stack load balancing method comprising:

storing the identification information, the second quantity, and the second transmission delay in a 16-bit second blank field in a binary form to generate the second data field, wherein during the storage, the second quantity is stored in 0th to 7th bits of the second blank field, the second transmission delay is stored in 8th to 10th bits of the second blank field, a preset reserved field is stored in 11th to 14th bits of the second blank field, and the identification information is stored in a 15th bit of the second blank field.

* * * * *